United States Patent
Cross, Jr. et al.

(10) Patent No.: US 8,498,873 B2
(45) Date of Patent: *Jul. 30, 2013

(54) ESTABLISHING A MULTIMODAL ADVERTISING PERSONALITY FOR A SPONSOR OF MULTIMODAL APPLICATION

(75) Inventors: Charles W. Cross, Jr., Wellington, FL (US); Hilary A. Pike, College Station, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,588

(22) Filed: Jun. 28, 2012

(65) Prior Publication Data

US 2012/0271642 A1 Oct. 25, 2012

Related U.S. Application Data

(63) Continuation of application No. 13/095,037, filed on Apr. 27, 2011, now Pat. No. 8,239,205, which is a continuation of application No. 11/530,921, filed on Sep. 12, 2006, now Pat. No. 7,957,976.

(51) Int. Cl.
 *G10L 21/00* (2006.01)
 *G10L 21/06* (2006.01)
(52) U.S. Cl.
 USPC .................. 704/275; 704/270; 704/270.1
(58) Field of Classification Search
 USPC ..................... 704/270, 270.1, 275
 See application file for complete search history.

(56) References Cited

U.S. PATENT DOCUMENTS

| | | | |
|---|---|---|---|
| 5,375,164 A | 12/1994 | Jennings | |
| 5,553,119 A | 9/1996 | McAllister et al. | |
| 5,577,165 A | 11/1996 | Takebayashi et al. | |
| 5,584,052 A | 12/1996 | Galau et al. | |
| 5,842,167 A * | 11/1998 | Miyatake et al. | 704/260 |
| 5,857,171 A * | 1/1999 | Kageyama et al. | 704/268 |
| 5,969,717 A | 10/1999 | Ikemoto | |
| 5,970,455 A * | 10/1999 | Wilcox et al. | 704/270 |
| 5,987,415 A | 11/1999 | Breese et al. | |
| 6,098,043 A * | 8/2000 | Forest et al. | 704/270 |

(Continued)

FOREIGN PATENT DOCUMENTS

| | | |
|---|---|---|
| CN | 1385783 | 12/2002 |
| CN | 1564123 | 1/2005 |

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Eric Yen
(74) *Attorney, Agent, or Firm* — Wolf, Greenfield & Sacks, P.C.

(57) ABSTRACT

Establishing a multimodal advertising personality for a sponsor of a multimodal application, including associating one or more vocal demeanors with a sponsor of a multimodal application and presenting a speech portion of the multimodal application for the sponsor using at least one of the vocal demeanors associated with the sponsor.

17 Claims, 9 Drawing Sheets

U.S. PATENT DOCUMENTS

| | | | |
|---|---|---|---|
| 6,144,938 A * | 11/2000 | Surace et al. | 704/257 |
| 6,208,972 B1 | 3/2001 | Grant et al. | |
| 6,240,170 B1 * | 5/2001 | Shaffer et al. | 379/142.15 |
| 6,243,375 B1 | 6/2001 | Speicher | |
| 6,275,806 B1 | 8/2001 | Pertrushin | |
| 6,301,560 B1 | 10/2001 | Masters | |
| 6,385,584 B1 | 5/2002 | McAllister et al. | |
| 6,513,011 B1 * | 1/2003 | Uwakubo | 704/275 |
| 6,606,599 B2 | 8/2003 | Grant et al. | |
| 6,708,153 B2 | 3/2004 | Brittan et al. | |
| 6,736,641 B2 | 5/2004 | Quiroz | |
| 6,813,605 B2 | 11/2004 | Nakamura et al. | |
| 6,842,767 B1 | 1/2005 | Partovi et al. | |
| 6,856,960 B1 | 2/2005 | Dragosh et al. | |
| 6,920,425 B1 | 7/2005 | Will et al. | |
| 6,932,668 B2 | 8/2005 | Digby et al. | |
| 6,944,592 B1 * | 9/2005 | Pickering | 704/251 |
| 6,983,252 B2 * | 1/2006 | Matheson et al. | 704/275 |
| 6,999,930 B1 | 2/2006 | Roberts et al. | |
| 7,035,805 B1 | 4/2006 | Miller | |
| 7,091,976 B1 * | 8/2006 | Ostermann et al. | 345/473 |
| 7,509,569 B2 | 12/2006 | Barrus et al. | |
| 7,171,243 B2 | 1/2007 | Watanabe et al. | |
| 7,188,067 B2 | 3/2007 | Grant et al. | |
| 7,324,947 B2 * | 1/2008 | Jordan et al. | 704/275 |
| 7,330,890 B1 | 2/2008 | Partovi et al. | |
| 7,340,389 B2 | 3/2008 | Vargas | |
| 7,346,153 B2 * | 3/2008 | Lewis et al. | 379/88.18 |
| 7,349,527 B2 | 3/2008 | Yacoub et al. | |
| 7,356,470 B2 * | 4/2008 | Roth et al. | 704/270 |
| 7,363,029 B2 * | 4/2008 | Othmer | 455/414.4 |
| 7,376,586 B1 | 5/2008 | Partovi et al. | |
| 7,386,450 B1 * | 6/2008 | Baumgartner et al. | 704/260 |
| 7,409,349 B2 | 8/2008 | Wang et al. | |
| 7,412,422 B2 * | 8/2008 | Shiloh | 705/74 |
| 7,454,348 B1 | 11/2008 | Kapilow et al. | |
| 7,487,085 B2 | 2/2009 | Ativanichayaphong et al. | |
| 7,552,403 B2 | 6/2009 | Wilson | |
| 7,640,160 B2 * | 12/2009 | Di Cristo et al. | 704/257 |
| 7,693,719 B2 | 4/2010 | Chu et al. | |
| 7,729,916 B2 | 6/2010 | Coffman et al. | |
| 7,949,526 B2 | 5/2011 | Ju et al. | |
| 8,005,729 B1 | 8/2011 | Ulm et al. | |
| 8,073,697 B2 | 12/2011 | Cross et al. | |
| 8,145,493 B2 | 3/2012 | Cross et al. | |
| 8,150,698 B2 | 4/2012 | Ativanichayaphong et al. | |
| 2002/0007276 A1 | 1/2002 | Rosenblatt et al. | |
| 2002/0049594 A1 | 4/2002 | Moore et al. | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0023442 A1 * | 1/2003 | Akabane et al. | 704/260 |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0215453 A1 * | 10/2004 | Orbach | 704/231 |
| 2004/0216036 A1 | 10/2004 | Chu et al. | |
| 2004/0236574 A1 | 11/2004 | Ativanichayaphong et al. | |
| 2004/0260562 A1 | 12/2004 | Kujirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0137862 A1 | 6/2005 | Monkowski | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/1888412 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger et al. | |
| 2005/0283367 A1 | 12/2005 | Cross | |
| 2006/0047510 A1 | 3/2006 | Ativanichayaphong et al. | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0136228 A1 | 6/2006 | Lin | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi et al. | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0118378 A1 * | 5/2007 | Skuratovsky | 704/260 |
| 2007/0265851 A1 | 11/2007 | Ben-David et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross et al. | |
| 2008/0065387 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Ativanichayaphong et al. | |
| 2008/0162136 A1 | 7/2008 | Agapi et al. | |
| 2008/0177530 A1 | 7/2008 | Cross et al. | |
| 2008/0195393 A1 | 8/2008 | Cross et al. | |
| 2008/0208584 A1 | 8/2008 | Ativanichayaphong et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Ben-David et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Bergl et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Ativanichayaphong et al. | |
| 2012/0046953 A1 | 2/2012 | Cross et al. | |
| 2012/0151326 A1 | 6/2012 | Cross et al. | |

FOREIGN PATENT DOCUMENTS

| | | |
|---|---|---|
| EP | 0794670 A | 9/1997 |
| EP | 1450350 | 8/2004 |

| JP | 2000155529 A | 6/2000 |
| JP | 2003140672 A | 5/2003 |
| WO | WO 99/48088 | 9/1999 |
| WO | WO 00/51106 A | 8/2000 |
| WO | WO 02/32140 A | 4/2002 |
| WO | WO 2004/062945 A | 7/2004 |
| WO | WO 2006/108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al., Robust Semantic Confidence Scoring ICSLP 2002: 7.sup.th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger et al.
U.S. Appl. No. 12/109,151, filed Apr. 2008, Agapi et al.
U.S. Appl. No. 12/109,167, filed Apr. 2008, Agapi et al.
U.S. Appl. No. 12/109,204, filed Apr. 2008, Agapi et al.
U.S. Appl. No. 12/109,227, filed Apr. 2008, Agapi et al,.
U.S. Appl. No. 12/109,214, filed Apr. 2008, Agapi et al.
U.S. Appl. No. 11/530,628, filed Sep. 11, 2006, Cross, Jr. et al.
U.S. Appl. No. 11/734,422, filed Apr. 12, 2007, Cross, Jr. et al.
U.S. Appl. No. 13/287,031, filed Nov. 1, 2011, Cross, Jr. et al.
U.S. Appl. No. 13/372,581, filed Feb. 14, 2012, Cross, Jr. et al.
U.S. Appl. No. 13/410,103, filed Mar. 1, 2012, Ativanichayaphong et al.

* cited by examiner

ESTABLISHING A MULTIMODAL ADVERTISING PERSONALITY FOR A SPONSOR OF MULTIMODAL APPLICATION

RELATED APPLICATIONS

This application claims the benefit as a continuation application under 35 U.S.C. §120 of U.S. patent application Ser. No. 13/095,037 filed Apr. 27, 2011 and entitled "Establishing a Multimodal Advertising Personality for a Sponsor of a Multimodal Application," which is a continuation of U.S. patent application Ser. No. 11/530,921 filed Sep. 12, 2006 and entitled "Establishing a Multimodal Advertising Personality for a Sponsor of a Multimodal Application," issued as U.S. Pat. No. 7,957,976, the entire contents of both of which are incorporated herein by reference.

BACKGROUND OF THE INVENTION

1. Field of the Invention

The field of the invention is data processing, or, more specifically, methods, apparatus, and products for establishing a multimodal advertising personality for a sponsor of a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/ speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a decent level of confidence, recognize the name of the city spoken. In the case where there is no explicit context, such as a blank text field for inputting any search query, this speaker independent recognition fails because a reasonably sized vocabulary is not available.

Incorporating speech into web applications enables new methods for advertising sponsors to reach and sell to customers. The modes in which advertising is delivered are often directly associated with a customer's perception of a sponsoring company. The application developer is now faced with the responsibility of presenting the sponsor's web application through modes that are acceptable to the company and attractive to end users.

SUMMARY OF THE INVENTION

Methods, apparatus, and computer program products are described for establishing a multimodal advertising personality for a sponsor of a multimodal application that include associating one or more vocal demeanors with a sponsor of a multimodal application and presenting a speech portion of the multimodal application for the sponsor using at least one of the vocal demeanors associated with the sponsor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
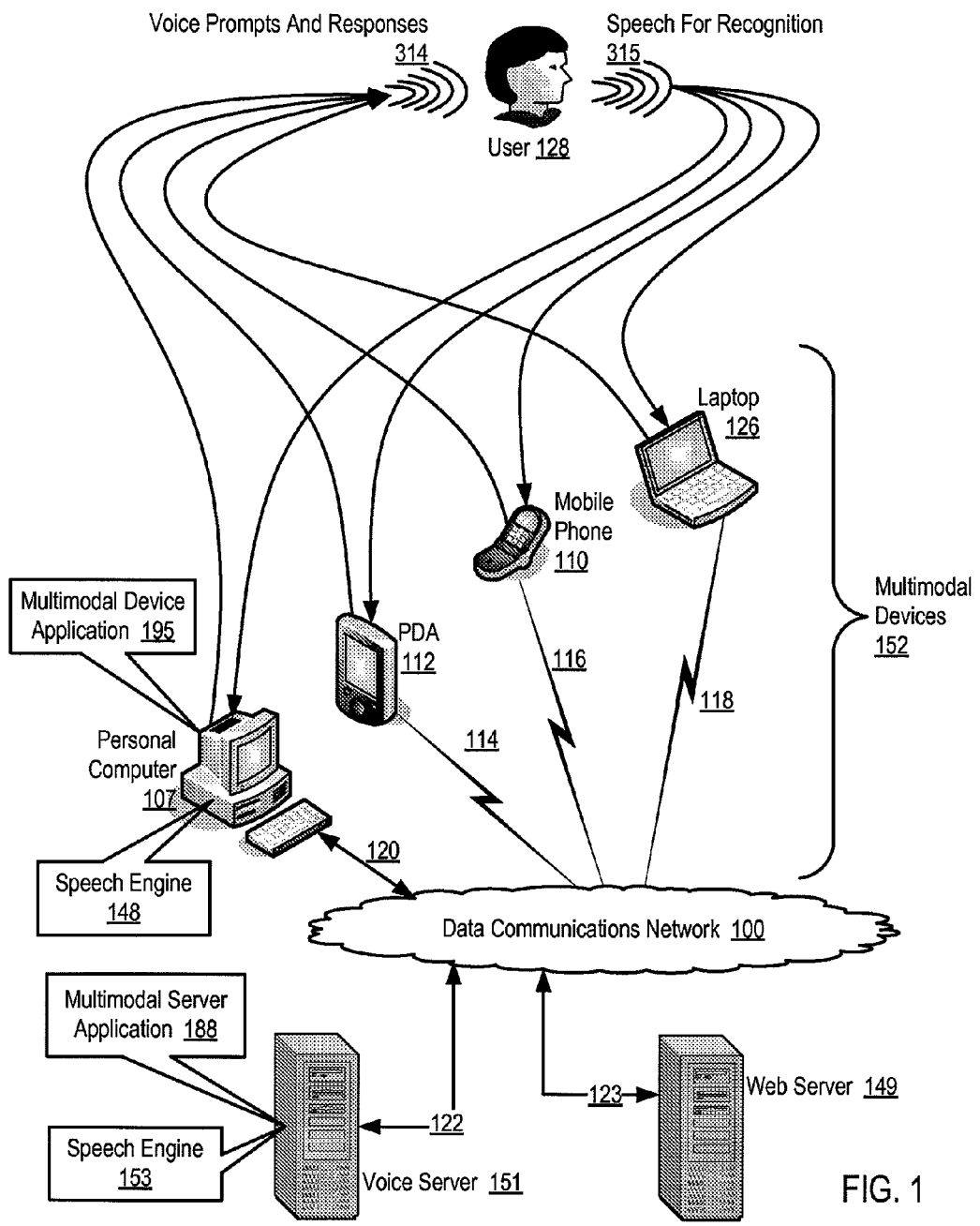
FIG. 1 sets forth a network diagram illustrating an exemplary system for establishing a multimodal advertising personality for a sponsor of a multimodal application according to embodiments of the present invention.

Exemplary methods, apparatus, and products for establishing a multimodal advertising personality for a sponsor of a multimodal application according to embodiments of the present invention are described with reference to the accompanying drawings, beginning with FIG. 1. FIG. 1 sets forth a network diagram illustrating an exemplary system for establishing a multimodal advertising personality for a sponsor of a multimodal application according to embodiments of the present invention. The system of FIG. 1 operates generally to establish a multimodal advertising personality for a multimodal application according to embodiments of the present invention by associating one or more vocal demeanors with a sponsor of a multimodal application and presenting a speech portion of the multimodal application for the sponsor using at least one of the vocal demeanors associated with the sponsor. According to embodiments of the present invention, a sponsor may purchase from an owner of the multimodal application exclusive use of a vocal demeanor within the multimodal application. Alternatively, a sponsor may purchase from an owner of the multimodal application exclusive use of a set of vocal demeanors within the multimodal application, including a right to exclude from use within a portion of the multimodal application all vocal demeanors not in the set of vocal demeanors. The multimodal application may select, among the set of vocal demeanors, a vocal demeanor for presentation of a speech portion of the multimodal application for the sponsor in dependence upon sponsor-provided rules. In addition to such use of a vocal demeanor, establishing a multimodal advertising personality according to embodiments of the present invention may also include purchasing by a sponsor from an owner of the multimodal application exclusive use of one or more visual demeanors within the multimodal application; associating one or more visual demeanors with the sponsor of a multimodal application; and presenting a visual portion of the multimodal application for the sponsor using at least one of the visual demeanors associated with the sponsor.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211

Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for establishing a multimodal advertising personality for a sponsor of a multimodal application according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention, is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (150) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal device application software that obtains speech recognition and speech synthesis services from a voice server located remotely across a network from the thin client.

Each of the example multimodal devices (152) in the system of FIG. 1 may be configured to establish a multimodal advertising personality for a multimodal application according to embodiments of the present invention by associating one or more vocal demeanors with a sponsor of a multimodal application and presenting a speech portion of the multimodal application for the sponsor using at least one of the vocal demeanors associated with the sponsor. The multimodal application in a multimodal device configured to establish a multimodal advertising personality for a multimodal application according to embodiments of the present invention is often referred to in this specification as a 'multimodal device application' (195). For ease of illustration, only the personal computer (107) in the system of FIG. 1 is illustrated with a multimodal device application (195), but all multimodal devices (152) may contain multimodal device applications.

The use of these four example multimodal devices (152) is for explanation only, not for limitation of the invention. Any automated computing machinery capable of accepting speech from a user, providing the speech digitized to an ASR engine, and receiving and playing speech prompts and responses from the voice server may be improved to function as a multimodal device for establishing a multimodal advertising personality for a sponsor of a multimodal application according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications. The voice server (151) in the system of FIG. 1 is configured to establish a multimodal advertising personality for a multimodal application according to embodiments of the present invention by associating one or more vocal demeanors with a sponsor of a multimodal application and presenting a speech portion of the multimodal application for the sponsor using at least one of the vocal demeanors associated with the sponsor. The multimodal application in a voice server configured to establish a multimodal advertising personality for a multimodal application according to embodiments of the present invention is often referred to in this specification as a 'multimodal server application' (188).

The system of FIG. 1 includes a data communications network (100) that connects the multimodal devices (152) and the voice server (151) for data communications. A data communications network for establishing a multimodal advertising personality for a sponsor of a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol (In, a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 includes a web server (149) connected for data communications through wireline connection (123) to network (100) and therefore to the multimodal devices (152). The web server (149) may be any server that provides to client devices markup documents that compose multimodal applications. The web server (149) typically provides such markup documents via a data communications protocol, HTTP, HDTP, WAP, or the like. The markup documents themselves may be implemented in any markup language that supports speech elements for identifying which speech to recognize and which words to speak, grammars, form elements, and the like, including, for example, X+V and SALT. A multimodal application in a multimodal device then, upon receiving from the web sever (149) a markup document as part of a multimodal application, may execute speech elements by use of a speech engine (148) in the multimodal device itself or by use of a speech engine (153) located remotely from the multimodal device in a voice server (151).

The arrangement of the voice server (151), the multimodal devices (152), and the data communications network (100) making up the exemplary system illustrated in FIG. 1 are for explanation, not for limitation. Data processing systems useful for establishing a multimodal advertising personality for a sponsor of a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Establishing a multimodal advertising personality for a sponsor of a multimodal application according to embodiments of the present invention in a thin client architecture typically is implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in establishing a multimodal advertising personality for a sponsor of a multimodal application according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a multimodal server application (188), a module of computer program instructions capable of operating a voice server in a system that is configured to establish a multimodal advertising personality for a multimodal application according to embodiments of the present invention. Multimodal server application (188) provides voice recognition services for multimodal devices by accepting requests for speech recognition and returning speech recognition results, including text representing recognized speech, text for use as variable values in dialogs, and text as string representations of scripts for semantic interpretation. Multimodal server application (188) also includes computer program instructions that provide text-to-speech ('TTS') conversion for voice prompts and voice responses to user input in multimodal applications such as, for example, X+V applications, SALT applications, or Java Speech applications.

Multimodal server application (188) in this example is also configured to establish a multimodal advertising personality for a multimodal application according to embodiments of the present invention by associating one or more vocal demeanors (550) with a sponsor (503) of a multimodal application and presenting a speech portion of the multimodal application for the sponsor using at least one of the vocal demeanors associated with the sponsor. In this example, both vocal demeanors (550) and sponsors (503) are represented as values of data structures stored in RAM (168). According to embodiments of the present invention, a sponsor may purchase from an owner of the multimodal application exclusive use of a vocal demeanor within the multimodal application. Alternatively, a sponsor may purchase from an owner of the multimodal application exclusive use of a set of vocal demeanors within the multimodal application, including a right to exclude from use within a portion of the multimodal application all vocal demeanors not in the set of vocal demeanors. The multimodal application may select, among the set of vocal demeanors, a vocal demeanor for presentation of a speech portion of the multimodal application for the sponsor in dependence upon sponsor-provided rules. In addition to such use of a vocal demeanor, establishing a multimodal advertising personality according to embodiments of the present invention may also include purchasing by a sponsor from an owner of the multimodal application exclusive use of one or more visual demeanors within the multimodal application; associating one or more visual demeanors with the sponsor of a multimodal application; and presenting a visual portion of the multimodal application for the sponsor using at least one of the visual demeanors associated with the sponsor.

The multimodal application in this example may be viewed as a combination of the multimodal server application and a remote multimodal device application cooperating through a VOIP protocol to establish a multimodal advertising personality for a sponsor of a multimodal application according to embodiments of the present invention. The multimodal device application, located on a multimodal device across a network from the voice server, is the so-called 'thin client,' so-called because much of the functionality for establishing the multimodal advertising personality is implemented on the voice server rather than on the multimodal device. The multimodal server application (188) can incorporate a selected vocal demeanor (550) as a component of a multimodal advertising personality into the multimodal server application by linking one or more markup elements of a markup document of the multimodal server application to one or more styles of a Cascading Style Sheet ('CSS') (514) and providing the CSS to a requesting multimodal device application that in turn loads the CSS into a multimodal device application and uses the CSS to control a multimodal user interface, that is, the voice aspects of a multimodal user interface.

Cascading Style Sheets is a stylesheet language used to describe the presentation of a document written in a markup language. The common application of CSS is to style web pages written in HTML and XHTML, but the language can be applied to any kind of XML document, including Scalable Vector Graphics ("SVG") and XML User Interface Language ("XUL"). The CSS specifications are maintained by the World Wide Web Consortium ("W3C"). CSS can control the vocal display of an X+V page as well as the visual display. The aural rendering of a document, already commonly used by the blind and print-impaired communities, combines speech synthesis and "auditory icons." Often such aural presentation occurs by converting the document to plain text and feeding this to a screen reader—software or hardware that simply reads all the characters on the screen. This results in less effective presentation than would be the case if the document structure were retained. Style sheet properties for aural presentation may be used together with visual properties (mixed media or multimodal) or as an aural alternative to visual presentation. When using aural properties, the aural CSS canvas consists of a three-dimensional physical space (sound surrounds) and a temporal space (one may specify sounds before, during, and after other sounds). The CSS properties also allow authors to vary the quality of synthesized speech (voice type, frequency, inflection, etc.). Here are examples of vocal rules or styles of an aural CSS:

```
H1, H2, H3, H4, H5, H6 {
    voice-family: paul;
    stress: 20;
    richness: 90;
    cue-before: url("ping.au")
}
P.heidi { azimuth: center-left }
P.peter { azimuth: right }
P.goat { volume: x-soft }
```

These examples direct a speech synthesizer (TTS engine) to speak headers in a voice (a kind of "audio font") called "paul," on a flat tone, but in a very rich voice. Before speaking the headers, a sound sample will be played from the given URL. Paragraphs with class "heidi" will appear to come from front left (if the sound system is capable of spatial audio), and paragraphs of class "peter" from the right. Paragraphs with class "goat" will be rendered very softly.

Multimodal server application (188) in this example is a user-level, multimodal, server-side computer program that may be implemented with a set of VoiceXML documents which taken together comprise a VoiceXML application. Multimodal server application (188) may be implemented as a web server, implemented in Java, C++, or another language, that supports X+V, SALT, or another multimodal language, by providing responses to HTTP requests from X+V, SALT or other multimodal clients. Multimodal server application (188) may, for a further example, be implemented as a Java server that runs on a Java Virtual Machine (102) and supports a Java voice framework by providing responses to HTTP requests from Java client applications running on multimodal devices. And multimodal server applications that support establishing a multimodal advertising personality for a sponsor of a multimodal application may be implemented in other ways as may occur to those of skill in the art, and all such ways are well within the scope of the present invention.

The voice server in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in establishing a multimodal advertising personality for a sponsor of a multimodal application according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine which words presently can be recognized. In this example, expansion includes conjunction and disjunction, and the vertical bars '|' mean 'or.' An ASR engine processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole accepts utterances like these, for example:

"phone bob next week,"
"telephone martha this afternoon,"
"remind me to call chris tomorrow," and "remind me to phone pete today."

The multimodal server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate from VoiceXML clients running remotely on multimodal devices, from X+V clients running remotely on multimodal devices, or from Java client applications running remotely on multimedia devices. In this example, VoiceXML interpreter (192) interprets and executes VoiceXML segments received from remote multimedia clients and provided to VoiceXML interpreter (192) through multimodal server application (188). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), multimodal server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 2:
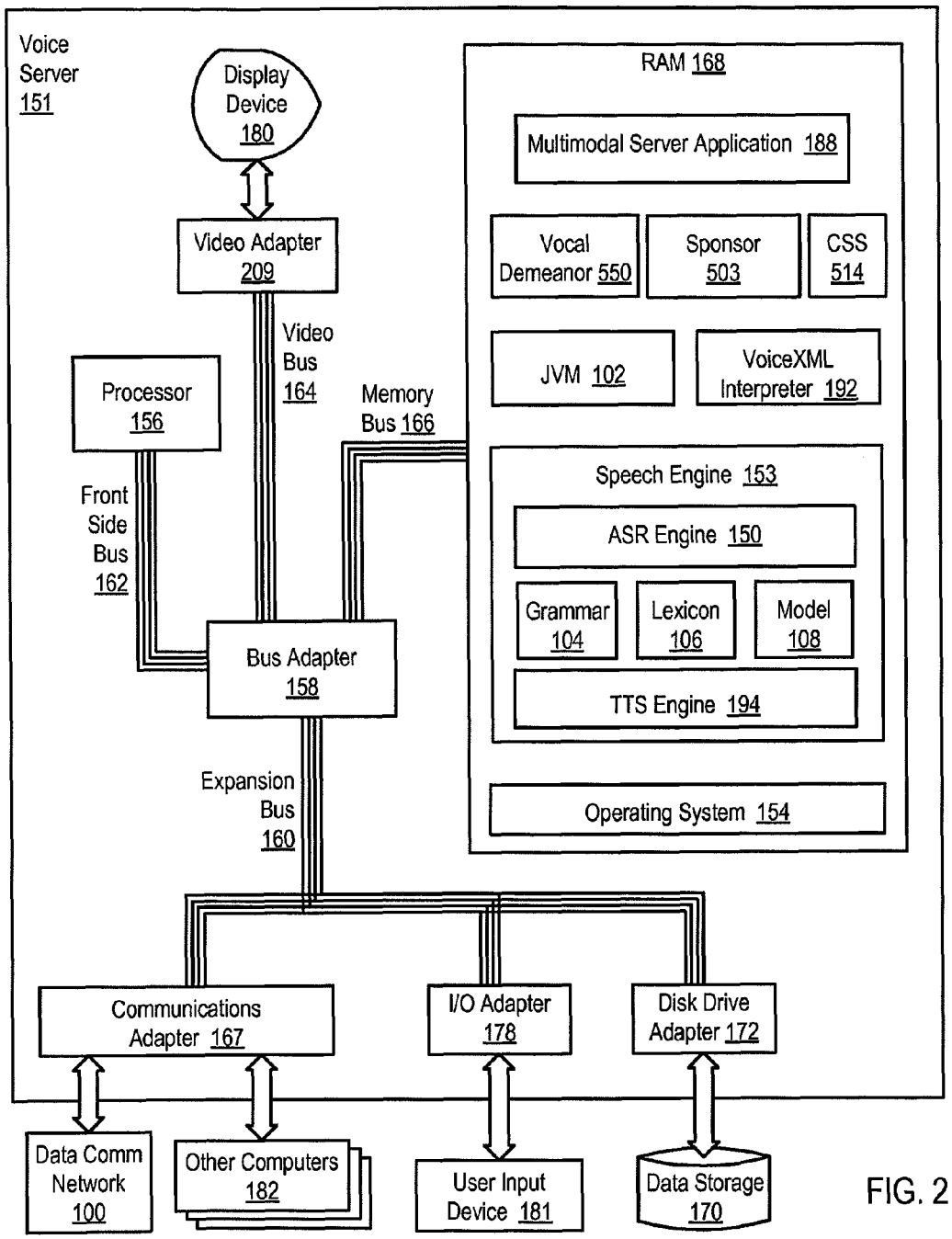
FIG. 2 sets forth a block diagram of automated computing machinery comprising an example of a computer useful as a voice server in establishing a multimodal advertising personality for a sponsor of a multimodal application according to embodiments of the present invention.

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for establishing a multimodal advertising personality for a sponsor of a multimodal application according to embodiments of the present invention include modems for wired dial-up communications, Ethernet (IEEE 802.3) adapters for wired data communications network communications, and 802.11 adapters for wireless data communications network communications.

Figure 3:
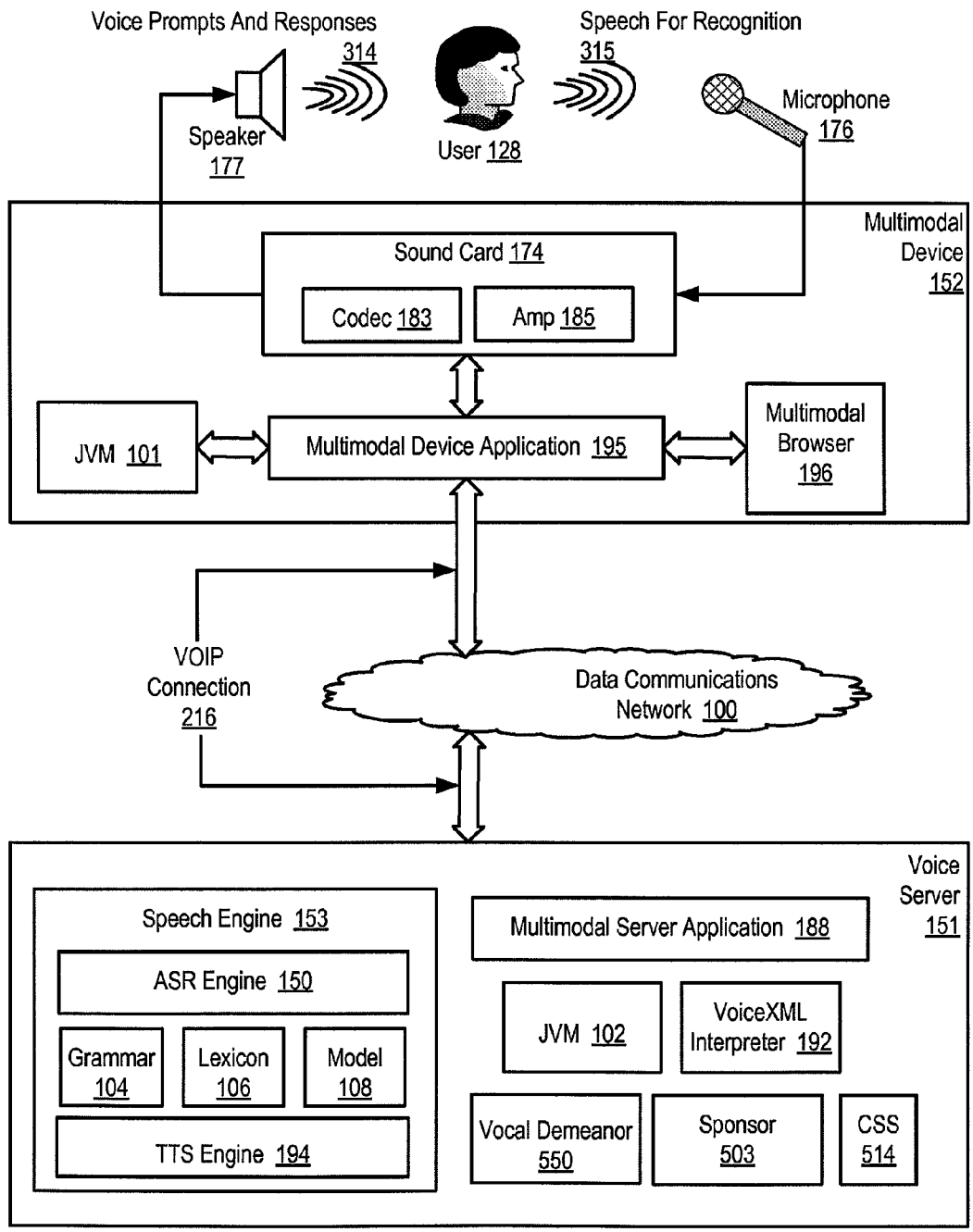
FIG. 3 sets forth a functional block diagram of exemplary apparatus for establishing a multimodal advertising personality for a sponsor of a multimodal application according to embodiments of the present invention.

For further explanation, FIG. 3 sets forth a functional block diagram of exemplary apparatus for establishing a multimodal advertising personality for a sponsor of a multimodal application in a thin client architecture according to embodiments of the present invention. The example of FIG. 3 includes a multimodal device (152) and a voice server (151) connected for data communication by a VOIP connection (216) through a data communications network (100). A multimodal device application (195) runs on the multimodal device (152), and a multimodal server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML grammars received from the multimodal device application and provided to VoiceXML interpreter (192) through multimodal server application (188). VoiceXML input to VoiceXML interpreter (192) may originate from the multimodal device application (195) implemented as a VoiceXML client running remotely the multimodal device (152), from the multimodal device application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal device application (195) is a user-level, multimodal, client-side computer program presents a voice interface to user (128), provides audio prompts and responses (314) and accepts input speech for recognition (315). Multimodal device application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal device application (195) then packages the digitized speech in a recognition request message according to a VOIP protocol, and transmits the speech to voice server (151) through the VOIP connection (216) on the network (100).

Multimodal server application (188) provides voice recognition services for multimodal devices by accepting requests for speech recognition and returning speech recognition results, including text representing recognized speech, text for use as variable values in dialogs, and output from execution of semantic interpretation scripts. Multimodal server application (188) includes computer program instructions that provide text-to-speech ('TTS') conversion for voice prompts and voice responses to user input in multimodal applications such as, for example, X+V applications, SALT applications, or Java Speech applications.

The multimodal server application (188) receives speech for recognition from a user and passes the speech through API calls to an ASR engine (150) for recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech founds as words in the lexicon to words in a grammar to determine whether words or phrases in speech are recognized by the ASR engine.

The multimodal server application (188) in this example, in a similar manner to that described above with reference to the system of FIG. 2, is configured to establish a multimodal advertising personality for a multimodal application according to embodiments of the present invention by associating one or more vocal demeanors (550) with a sponsor (503) of a multimodal application and presenting a speech portion of the multimodal application for the sponsor using at least one of the vocal demeanors associated with the sponsor. In this example, both vocal demeanors (550) and sponsors (503) are represented as values of data structures voice server (151). According to embodiments of the present invention, a sponsor may purchase from an owner of the multimodal application exclusive use of a vocal demeanor within the multimodal application. Alternatively, a sponsor may purchase from an owner of the multimodal application exclusive use of a set of vocal demeanors within the multimodal application, including a right to exclude from use within a portion of the multimodal application all vocal demeanors not in the set of vocal demeanors. The multimodal application may select, among the set of vocal demeanors, a vocal demeanor for presentation of a speech portion of the multimodal application for the sponsor in dependence upon sponsor-provided rules. In addition to such use of a vocal demeanor, establishing a multimodal advertising personality according to embodiments of the present invention may also include purchasing by a sponsor from an owner of the multimodal application exclusive use of one or more visual demeanors within the multimodal application; associating one or more visual demeanors with the sponsor of a multimodal application; and presenting a visual portion of the multimodal application for the sponsor using at least one of the visual demeanors associated with the sponsor.

The multimodal application in this example may be viewed as a combination of the multimodal server application (188) and a remote multimodal device application (195) cooperating through a VOIP protocol connection (216) to establish a multimodal advertising personality for a sponsor of a multimodal application according to embodiments of the present invention. The multimodal device application (195), located on a multimodal device (152) across a network (100) from the voice server (151), is the so-called 'thin client,' so-called because much of the functionality for establishing the multimodal advertising personality is implemented on the voice server (151) rather than on the multimodal device (152). The multimodal server application (188) can incorporate a vocal demeanor (550) as a component of a multimodal advertising personality into the multimodal server application by linking one or more markup elements of a markup document of the multimodal server application to one or more styles of a Cascading Style Sheet ('CSS') (514) and providing the CSS to a requesting multimodal device application that in turn loads the CSS into a multimodal device application and uses the CSS to control a multimodal user interface, that is, the voice aspects of a multimodal user interface.

Figure 4:
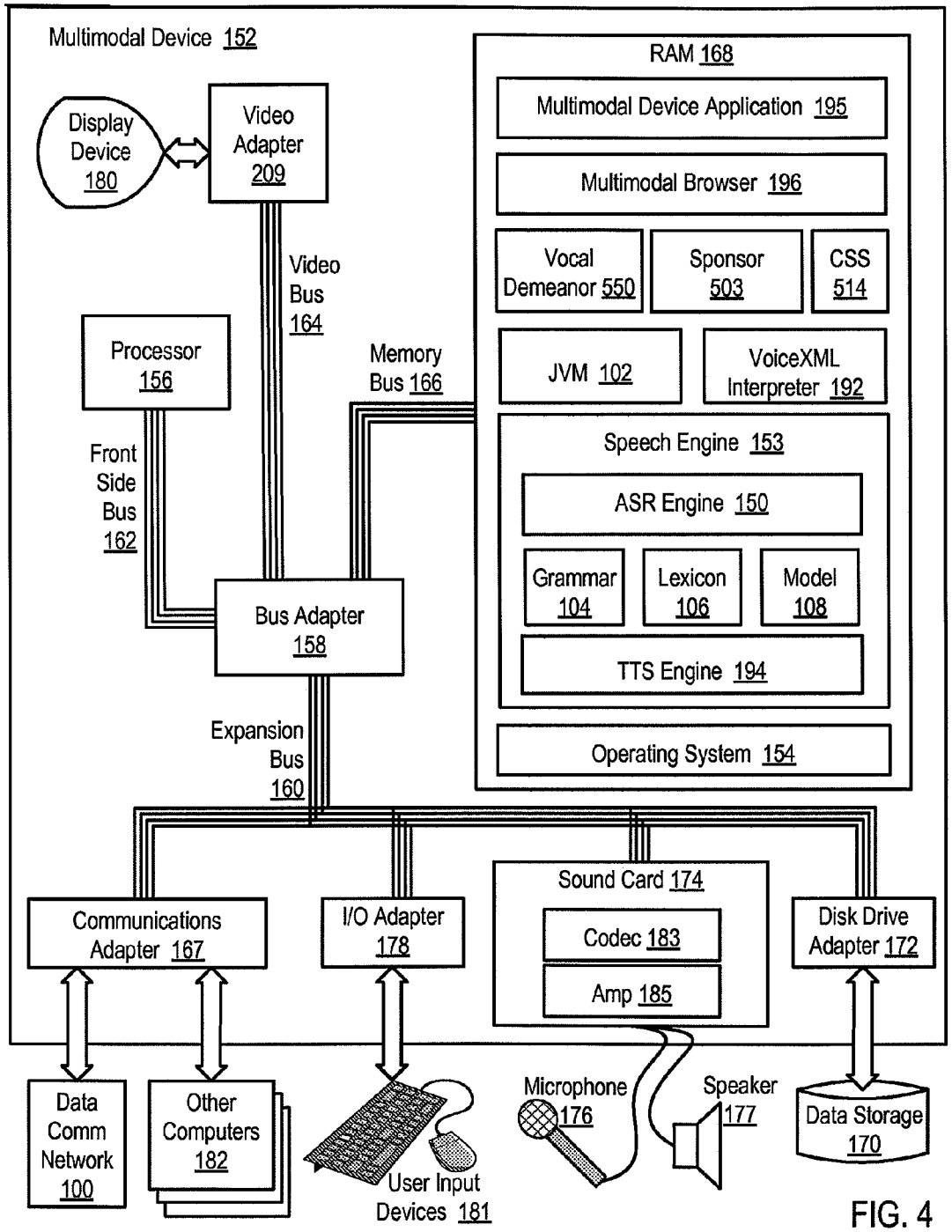
FIG. 4 sets forth a block diagram of automated computing machinery comprising an example of a computer useful as a multimodal device in establishing a multimodal advertising personality for a sponsor of a multimodal application according to embodiments of the present invention.

Establishing a multimodal advertising personality for a sponsor of a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in establishing a multimodal advertising personality for a sponsor of a multimodal application according to embodiments of the present invention. In apparatus implementing thick multimodal clients as illustrated in FIG. 4, there is only a multimodal device (152), no network, no VOIP connection, and no voice server containing a remote speech engine. All the components needed for establishing a multimodal advertising personality for a sponsor of a multimodal application according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), and so on, including a speech engine (153). As in the system of FIG. 4, the speech engine in the multimodal device of FIG. 2 includes an ASR engine (150), a grammar (104), a lexicon (106), a language-dependent acoustic model (108), and a TTS engine (194). The speech engine (153) in this kind of embodiment often is implemented as an embedded module in a small form factor device such as a handheld device, a mobile phone, PDA, and the like. An example of an embedded speech engine useful for establishing a multimodal advertising personality for a sponsor of a multimodal application according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal device application (195), a module of computer program instructions capable of operating a multimodal device as an apparatus that supports establishing a multimodal advertising personality for a sponsor of a multimodal application according to embodiments of the present invention. The multimodal device application (195) implements speech recognition by accepting speech for recognition from a user and sending the speech for recognition through API calls to the ASR engine (150). The multimodal device application (195) implements speech synthesis generally by sending words to be used as prompts for a user to the TTS engine (194). As an example of thick client architecture, the multimodal device application (195) in this example does not send speech for recognition across a network to a voice server for recognition, and the multimodal device application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal device application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal device application (195) may be implemented as a set or sequence of X+V documents executing in a multimodal browser (196) or microbrowser that passes VoiceXML grammars and digitized speech through API calls directly to an embedded VoiceXML interpreter (192) for processing. The embedded VoiceXML interpreter (192) may in turn issue requests for speech recognition through API calls directly to the embedded ASR engine (150). Multimodal device application (195) also can provide speech synthesis, TTS conversion, by API calls to the embedded TTS engine (194) for voice prompts and voice responses to user input.

In a further class of exemplary embodiments, the multimodal device application (195) may be implemented as a Java voice application that executes on Java Virtual Machine (102) and calls the ASR engine (150) and the TTS engine (194) directly through APIs for speech recognition and speech synthesis services. In further exemplary embodiments, the multimodal device application (195) may be implemented as a set or sequence of SALT documents executed on a multimodal browser (196) or microbrowser that calls the ASR engine (150) and the TTS engine (194) through APIs for speech recognition and speech synthesis services. In addition to X+V, SALT, and Java implementations, multimodal device application (195) may be implemented in other technologies as will occur to those of skill in the art, and all such implementations are well within the scope of the present invention.

The multimodal device application (195) in this example is configured to establish a multimodal advertising personality for a sponsor of a multimodal application according to embodiments of the present invention by associating one or more vocal demeanors (550) with a sponsor (503) of a multimodal application and presenting a speech portion of the multimodal application for the sponsor using at least one of the vocal demeanors associated with the sponsor. According to embodiments of the present invention, a sponsor may purchase from an owner of the multimodal application exclusive use of a vocal demeanor within the multimodal application. Alternatively, a sponsor may purchase from an owner of the multimodal application exclusive use of a set of vocal demeanors within the multimodal application, including a right to exclude from use within a portion of the multimodal application all vocal demeanors not in the set of vocal demeanors. The multimodal application may select, among the set of vocal demeanors, a vocal demeanor for presentation of a speech portion of the multimodal application for the sponsor in dependence upon sponsor-provided rules. In addition to such use of a vocal demeanor, establishing a multimodal advertising personality according to embodiments of the present invention may also include purchasing by a sponsor from an owner of the multimodal application exclusive use of one or more visual demeanors within the multimodal application; associating one or more visual demeanors with the sponsor of a multimodal application; and presenting a visual portion of the multimodal application for the sponsor using at least one of the visual demeanors associated with the sponsor.

The multimodal device application (195) can incorporate a vocal demeanor (550) as a component of a multimodal advertising personality into the multimodal server application by linking one or more markup elements of a markup document of the multimodal server application to one or more styles of a Cascading Style Sheet ('CSS') (514), loading the CSS into the multimodal device application (195), and using the CSS to control a multimodal user interface, that is, the voice aspects of a multimodal user interface. The multimodal device application (195) in this example, running on a standalone multimodal device (152) with no network, no VOIP connection, and no voice server containing a remote speech engine or a remote multimodal server application, is an example of a so-called 'thick client,' so-called because all of the functionality for establishing the multimodal advertising personality is implemented on the multimodal device itself.

Figure 5:
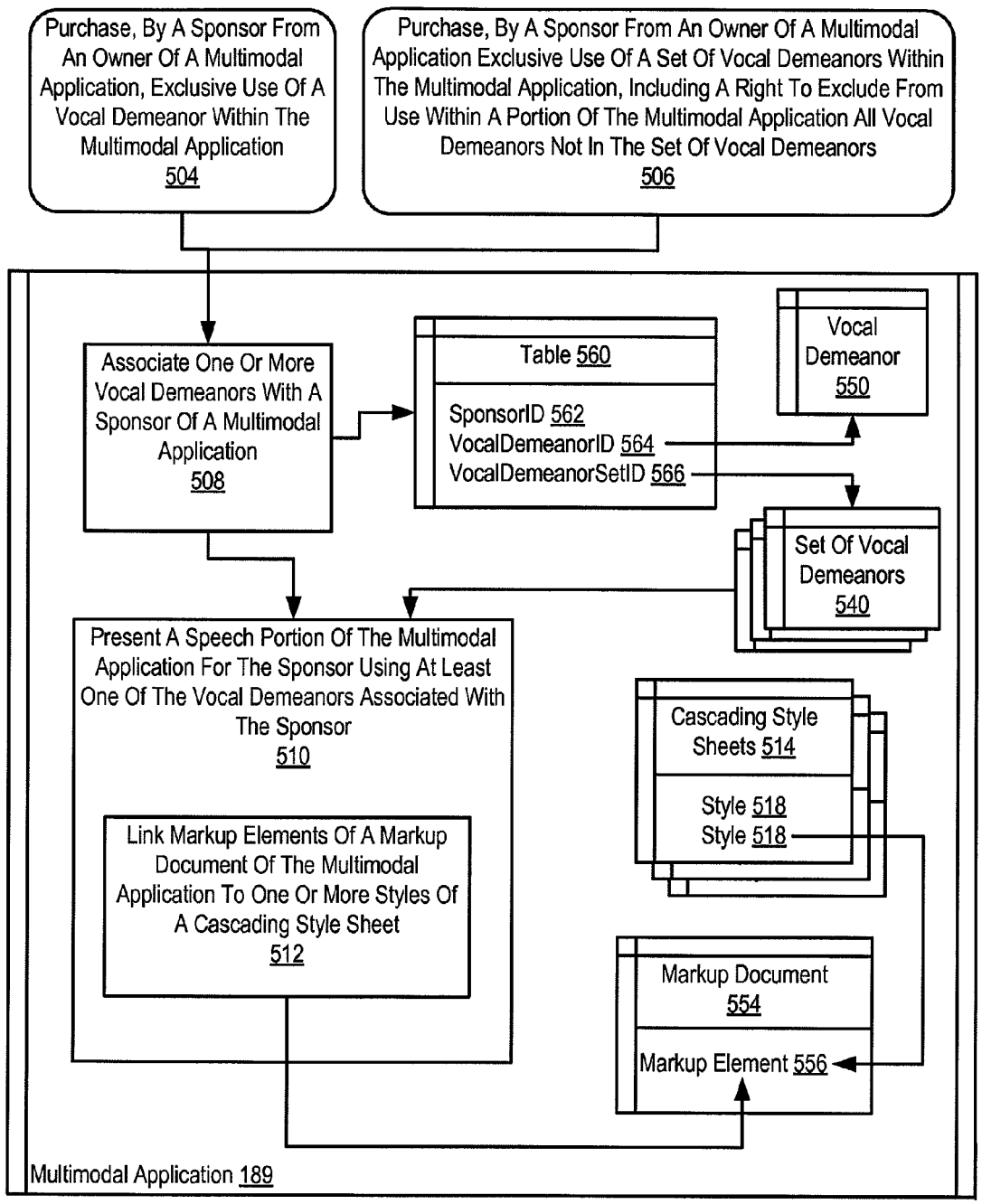
FIG. 5 sets forth a flow chart illustrating an exemplary method of establishing a multimodal advertising personality for a sponsor of a multimodal application according to embodiments of the present invention.

For further explanation, FIG. 5 sets forth a flow chart illustrating an exemplary method of establishing a multimodal advertising personality for a sponsor of a multimodal application (189) according to embodiments of the present invention. The multimodal application may be implemented as described above with a thin client architecture in which part of the multimodal application functionality is implemented in a multimodal device application on a multimodal device and part of the multimodal application functionality is implemented in a multimodal server application in a voice server; or the multimodal application may be implemented in a thick client architecture in which all of the multimodal application functionality is implemented in a multimodal client application on a multimodal device.

The method of FIG. 5 includes associating (508) one or more vocal demeanors (550) with a sponsor of a multimodal application (189). A 'sponsor' is an advertising sponsor, a person or organization that has arranged with an owner of a multimodal application to display advertisements on display screens, windows, subwindows, or frames of the multimodal application. The displays typically include visual elements as well as vocal elements, and the multimodal application can accept vocal as well as non-vocal input from users.

A vocal demeanor defines the speaking voice of a multimodal application for one or more voice prompts. The voice prompts are speech output of a multimodal application produced by a speech synthesizer or TTS engine under multimodal application program control. The TTS engine uses a standard voice model to generate digitized speech for output to a user, and alters the output of the voice model according to selected styles of a CSS to produce voice output conforming to a vocal demeanor. The voice output conforms to the vocal demeanor because the CSS and therefore the styles of the CSS that govern the alternations of the standard voice model are chosen to generate voice output that accords with vocal attributes of the vocal demeanor. Such vocal attributes may include, for example, speech rate, voice family, pitch, pitch range, stress, and richness. A combination of such vocal attributes is defined by each vocal demeanor. Such combinations can produce voices such as: Energetic Female, Tired Female, Normal Female, Low Pitch Female, Higher Pitch Female, Energetic Male, Tired Male, Normal Male, Low Pitch Male, Higher Pitch Male, and so on, as will occur to those of skill in the art.

As mentioned, vocal attributes defining a vocal demeanor may include, for example, speech rate, voice family, pitch, pitch range, stress, and richness. Speech rate is speaking rate for prompts in words per minute. Voice family represents in effect a font for speech, describing the overall nature and timbre of a voice either in generic terms, male, female, child, or in specific terms, Mary's voice, Jack's voice, and so on. The name of a voice family may be viewed as identifying a vocal font for a vocal demeanor. Pitch is the average frequency of a speaking voice for prompts. Voice family may be related to pitch: An average pitch for a male voice is typically about 120 Hertz, while an average pitch for a female voice is typically about 210 Hertz.

Pitch range is a measure of variation in average pitch. The perceived pitch of a voice is determined by its fundamental frequency and typically has a value of about 120 Hz for a male voice and about 210 Hz for a female voice. Human languages are spoken with varying inflection and pitch—variations that convey additional meaning and emphasis. A highly animated voice, that is, a voice that is heavily inflected, displays a high pitch range. Pitch range specifies the range over which these variations may occur in voice prompts, that is, how much the fundamental frequency may deviate from the average pitch. Pitch range defines the amount of inflection in a vocal prompt. A low pitch range value indicates a monotone prompt; a high pitch range value identifies an animated voice prompt. A medium pitch range value indicates normal inflection.

Richness is a measure of the brightness of a voice prompt. A rich voice will 'carry' in a large room; a smooth voice carries less well. The term 'smooth' refers to how a waveform of the voice looks when drawn. A rich voice has a higher ratio of peak amplitude values to average amplitude values than a smooth voice. A rich voice is more 'condensed' in effect than a smooth voice.

In this example of FIG. 5, sponsors are associated with vocal demeanors by use of a data structure, table (560), in which each record of the table represents an association of a sponsor with a vocal demeanor. Each record in table (560) includes a field named sponsorID (562) for storing a sponsor identification such as a sponsor's name, identification code, or other sponsor identifier. Each record in table (560) also includes a field named vocalDemeanorID (564) for storing an identifier for a vocal demeanor, a vocal demeanor name, a vocal demeanor ID code, or other identifier for a vocal demeanor. The use of a table in this example is for explanation only, not for limitation of the invention; sponsors and vocal demeanors may be associated by other means as will occur to those of skill in the art including, for example, linked lists, hash tables, C-style data structures, arrays, arrays of data structures, and so on.

The method of FIG. 5 also includes two alternative predicate steps for associating vocal demeanors with sponsors: purchasing (504) by the sponsor from an owner of the multimodal application exclusive use of a vocal demeanor within the multimodal application and purchasing (506) by the sponsor from an owner of the multimodal application exclusive use of a set of vocal demeanors within the multimodal application, including a right to exclude from use within a portion of the multimodal application all vocal demeanors not in the set of vocal demeanors. In order to associate a sponsor with a set of vocal demeanors, table (560) is expanded in this example to include a column named vocalDemeanorSetID (566) for storing a set identification code for each set of vocal demeanors. The inclusion of the vocalDemeanorSetID (566) field in each record of table (560) along with the sponsorID field (562) means that each sponsor in this example may be purchase and be associated with more than one set of vocal demeanors. These alternative steps (504, 506) are further explained with reference to FIG. 5 and also with reference to FIG. 6.

Figure 6:
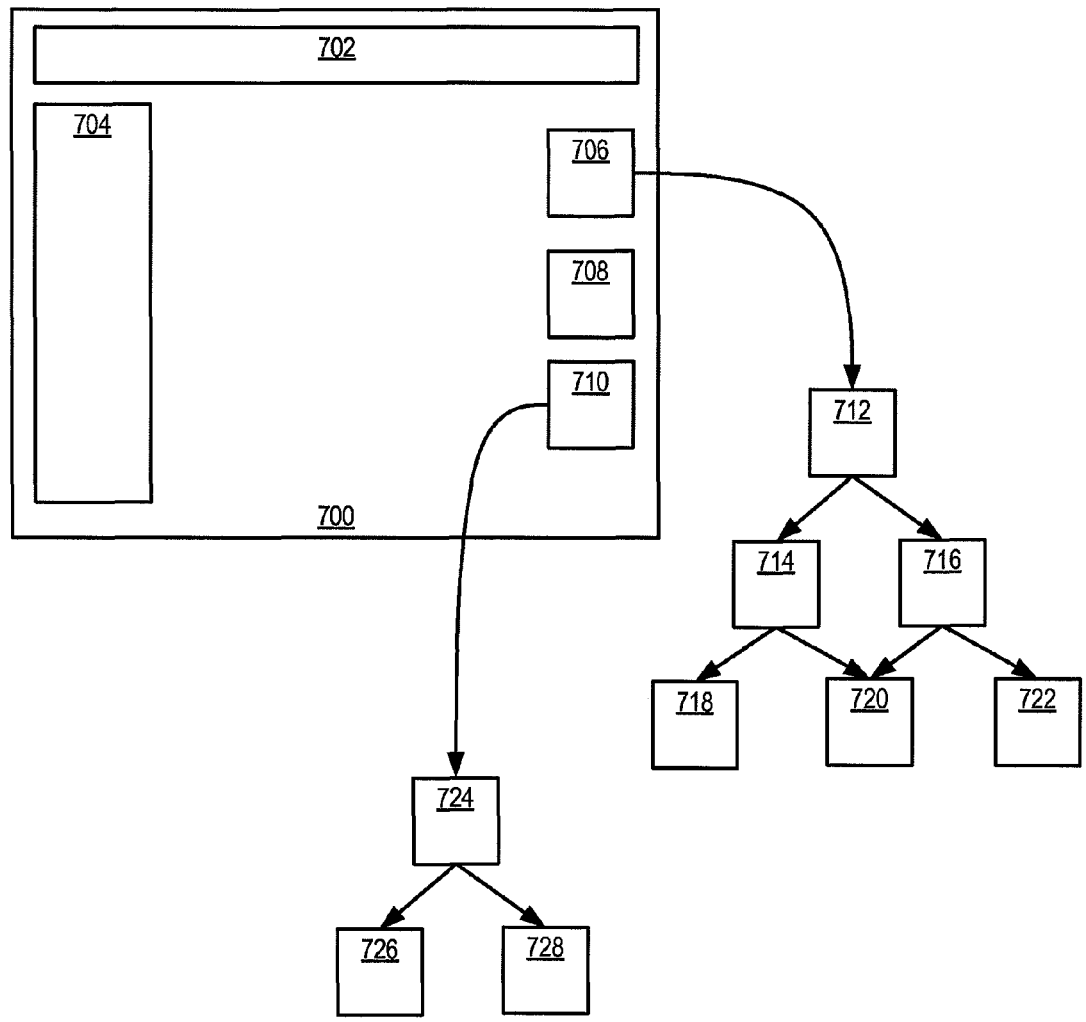
FIG. 6 sets forth a block diagram of a multimodal application illustrating exclusive use of a vocal demeanor within a multimodal application.

FIG. 6 sets forth a block diagram of a multimodal application illustrating exclusive use of a vocal demeanor within a multimodal application. In the example of FIG. 6, a multimodal application operates a display screen (700) by defining on the screen five subwindows or 'frames': a heading banner frame (702) across the top of the screen, a navigation frame (704) down the left side of the screen, and three advertisement frames (706, 708, 710) vertically aligned along the right side of the screen. Each advertisement frame contains visual and vocal advertisement from a different sponsor. Each sponsor values distinguishing its advertising content from other content on the screen by vocal demeanor as well as visual demeanor. Each sponsor therefore can purchase from an owner of the multimodal application exclusive use of a vocal demeanor within the multimodal application. The sponsor that displays advertisement content in frame (706), for example, can purchase the exclusive right to a vocal demeanor of a female speaking animated English with an Italian accent throughout the entire multimodal application, which in addition to the display on screen (700) may extend to dozens or hundreds of other frames and screens as well. Similarly, the sponsor that displays advertisement content in frame (708), can purchase the exclusive right to a vocal demeanor of a calm male speaking voice with a Southern accent throughout the entire multimodal application. In addition to acquiring exclusive rights to a single vocal demeanor, a sponsor also can purchase exclusive rights throughout the multimodal application to a set of demeanors, for example:

Animated adult male speaking English with a Southern accent,

Animated adult female speaking English with a Southern accent,

Animated female child speaking English with a Southern accent, and

Animated male child speaking English with a Southern accent.

In addition to an exclusive interest to a particular vocal demeanor, a sponsor may also be concerned to exclude from use within a portion of the multimodal application all vocal demeanors not in a set of vocal demeanors. A multimodal application may be viewed as a tree with an XHTML document at the root and hyperlinks within the root document leading to branch documents and leaf documents in the tree. Consider the example of links from frame (706). Such links are likely to be considered part of the advertising content of the sponsor of frame (706). Such links may lead to subtrees of the multimodal application (712-722) that are particularly pertinent to the interests of the sponsor of frame (706), a home website, sales data input screens, contact information screens, and so on. On such screens, the sponsor of frame (706) may wish to exclude all vocal demeanors not in a set purchased by the sponsor of frame (706), so that all such screens or frames present to users the same overall vocal demeanor—or a coherent set of vocal demeanors chosen by the sponsor. In this circumstance, a sponsor can purchase from an owner of the multimodal application exclusive use of a set of vocal demeanors within the multimodal application, including a right to exclude from use within a portion of the multimodal application all vocal demeanors not in the set of vocal demeanors.

Vocal demeanors may be predefined and implemented as computer data structures having data elements representing vocal characteristics, lists of computer data, objects instantiated from demeanor classes in an object-oriented programming language, records in tables of a database, and so on. A vocal demeanor is not necessarily the only component of a multimodal advertising personality. A multimodal advertising personality may include visual aspects, implemented for example with a visual demeanor, as well. Visual demeanor is the overall visual appearance of a multimodal application, background colors, text colors, text fonts, selection and placement of graphic elements, and so on. Visual demeanor may be characterized by attributes such as age (vibrant colors for young users, quieter colors for mature users), gender (sans serif fonts for women, serifs for men), location (Eiffel Tower background for Parisians, the Alamo for Texans), time (bright color palettes in the morning, quieter palettes in the evening), application domain (more text for legal subjects, more graphics for architectural subjects), and so on as will occur to those of skill in the art.

Again with reference to FIG. 5: The method of FIG. 5 also includes presenting (510) a speech portion of the multimodal application for the sponsor using at least one of the vocal demeanors (550) associated with the sponsor. A speech portion of a multimodal application may be a prompt, a recognition result, or a semantic interpretation result, all of which may be presented back through a user interface to a user as speech. In the example of FIG. 5, presenting (510) a speech portion of the multimodal application for the sponsor using at least one of the vocal demeanors (550) associated with the sponsor includes linking (512) one or more markup elements (556) of a markup document (554) of the multimodal application (189) to one or more styles (518) of a Cascading Style Sheet ('CSS') (514). The multimodal application can link (512) one or more markup elements (556) of a markup document (554) of the multimodal application (189) to one or more styles (518) of a CSS (514) as shown in the following example X+V page:

```
<html xmlns="http://www.w3.org/1999/xhtml"
    xmlns:vxml="http://www.w3.org/2001/vxml"
    xmlns:ev="http://www.w3.org/2001/xml-events"
>
<head>
    <link rel="stylesheet" type="text/css"
        href="http://www.ibm.com/style/demeanor.jsp" />
    <title>What would you like to drink?</title>
    <vxml:form id="drinkform">
        <vxml:field name="drink">
            <vxml:prompt src="#p1">
            </vxml:prompt>
            <vxml:grammar><![CDATA[
                #JSGF V1.0;
                grammar drinks;
                public <drinks> = coffee | tea | milk | nothing;]]>
            </vxml:grammar>
            <vxml:filled>
                <vxml:assign name="document.fid.in1.value"
                    expr="drink"/>
            </vxml:filled>
        </vxml:field>
        <vxml:block>
        Your <vxml:value expr="drink"/> is coming right up!
        </vxml:block>
    </vxml:form>
</head>
<body bgcolor="#FFFFFF">
    <h2 id="p1" class="server">Would you like coffee, tea, milk, or nothing?</h2>
    <form name="fid" action="ctmn0-style.mxml">
        <table>
            <tbody>
                <tr><td>Breakfast Drink:</td>
                    <td>
                        <input type="text" name="in1"
                            ev:event="focus"
                            ev:handler="#drinkform"/>
                    </td>
                </tr>
            </tbody>
        </table>
    </form>
</body>
</html>
```

In this example X+V page, a VoiceXML form identified as "drinkform" voice enables an XHTML input form named "fid." The table data field named "in1" registers "drinkform" as an event handler for "focus" events in the field; that is, when field "in1" gains focus, the multimodal application calls "drinkform" to administer vocal input to field "in1." By use of the <drinks> grammar:

<drinks>=coffee|tea|milk|nothing;

"drinkform" can recognize the words "coffee," "tea," "milk," or "nothing" as vocal input to field "in1."

This example X+V page shows a link, defined as a <link> element, to an external CSS identified by the URL "http://www.ibmcom/style/demeanor.jsp":

```
<link rel="stylesheet" type="text/css"
    href="http://www.ibm.com/style/demeanor.jsp" />
```

This example X+V page defines a multimodal speech dialog as a VoiceXML <vxml:form> element with id="drinkform." The <vxml:form> element includes a prompt <vxml:prompt src="#p1"> that refers to an <h2> heading element:

```
<h2 id="p1" class="server">Would you like coffee, tea, milk, or
    nothing?</h2>
``` identified as id="p1." The <h2> heading element is controlled by a class attribute, class="server," that identifies the style to be returned from the reference to the external CSS, "demeanor.jsp." The value of the style returned may be, for example:

```
h2.server {voice-family: female}
h3 {voice-family: male}
``` signifying that the spoken prompt for the <h2> heading is to be rendered in a female voice, and any prompts for <h3> headings are to be rendered in a male voice. Specific demeanor attributes may be implemented for example as session attributes of a logon session, or as attributes that persist even across sessions in a persistent user profile. Session-specific attributes may be passed as a cookie in the header of an HTTP request for the CSS. Analogous schemes as may occur to those of skill in the art can be constructed for the generation of grammars and the vocabulary used in prompts.

The fact that the referenced CSS is named "demeanor.jsp" indicates that the external CSS is returned from the computation of a Java Server Page. This effectively makes the referenced external CSS a variable. The multimodal application, through its operating environment, a browser or a JVM, can select and return a CSS whose styles effect the selected vocal demeanor. The vocal demeanor typically is selected to match evaluated attributes of user interaction, as described in more detail above. A CSS can be selected from among many CSSes, hundreds or thousands, according to the characteristics of a matching demeanor, age, gender, location, application domain, speech rate, voice family, pitch, pitch range, richness, and so on. Returning a selected CSS, loading it into the multimodal application, and using it to govern the presentation of the user interface, speech aspects in particular, is an example of an effective way of presenting a speech portion of the multimodal application for the sponsor using at least one of the vocal demeanors associated with the sponsor in establishing a multimodal advertising personality for a sponsor of a multimodal application.

Figure 7:
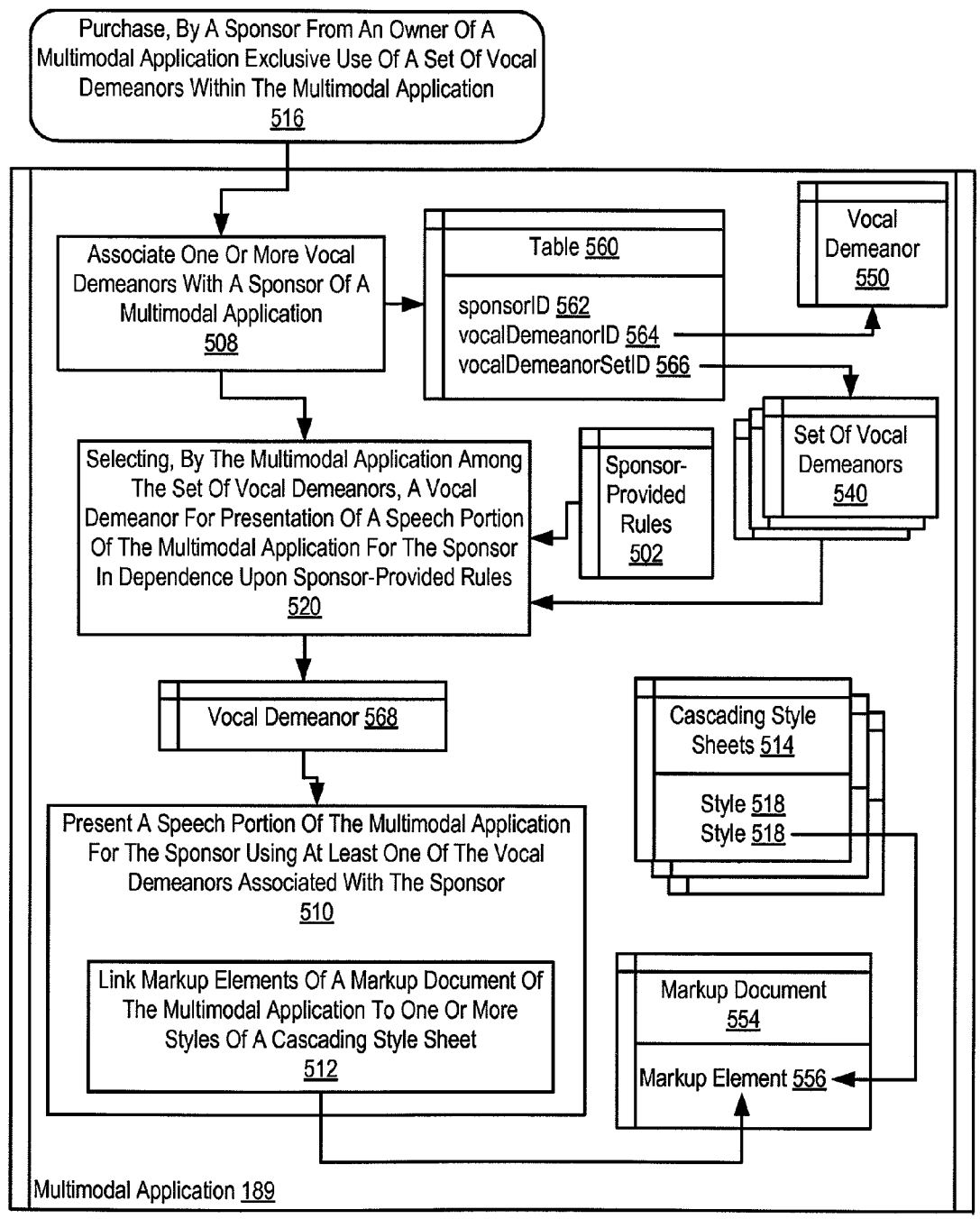
FIG. 7 sets forth a flow chart illustrating a further exemplary method of establishing a multimodal advertising personality for a sponsor of a multimodal application according to embodiments of the present invention.

For further explanation, FIG. 7 sets forth a flow chart illustrating a further exemplary method of establishing a multimodal advertising personality for a sponsor of a multimodal application (189) according to embodiments of the present invention. The method of FIG. 7 includes associating (508) one or more vocal demeanors with a sponsor of a multimodal application and presenting (510) a speech portion of the multimodal application for the sponsor using at least one of the vocal demeanors associated with the sponsor, both of which process steps function as described above with regard to the method of FIG. 5. The method of FIG. 5 also includes purchasing (516), by the sponsor from an owner of the multimodal application, exclusive use of a set of vocal demeanors within the multimodal application, a process step that can operate as described above for step (506) in the method of FIG. 5.

The method of FIG. 5 also includes selecting (520), by the multimodal application (189) among the set (540) of vocal demeanors, a vocal demeanor (568) for presentation of a speech portion of the multimodal application for the sponsor in dependence upon sponsor-provided rules (502). In this way, as the multimodal application navigates through pages of the application on which the sponsored vocal demeanors are used, the sponsor can determine how to change the voice from page to page and even within a single page. Examples of sponsor-provided rules include:

select a hard-sell vocal demeanor for a repeat buyer, such as a high-speed, high-pitch, male vocal demeanor select a soft-sell vocal demeanor for a new buyer, such as a slow, low-pitch, female vocal demeanor In these examples, the formation of the rules includes user characteristics, but the advertising methodology is still oriented to the sponsor because the sponsor sets the rules for selection of vocal demeanors in establishing a multimodal advertising personality.

Figure 8:
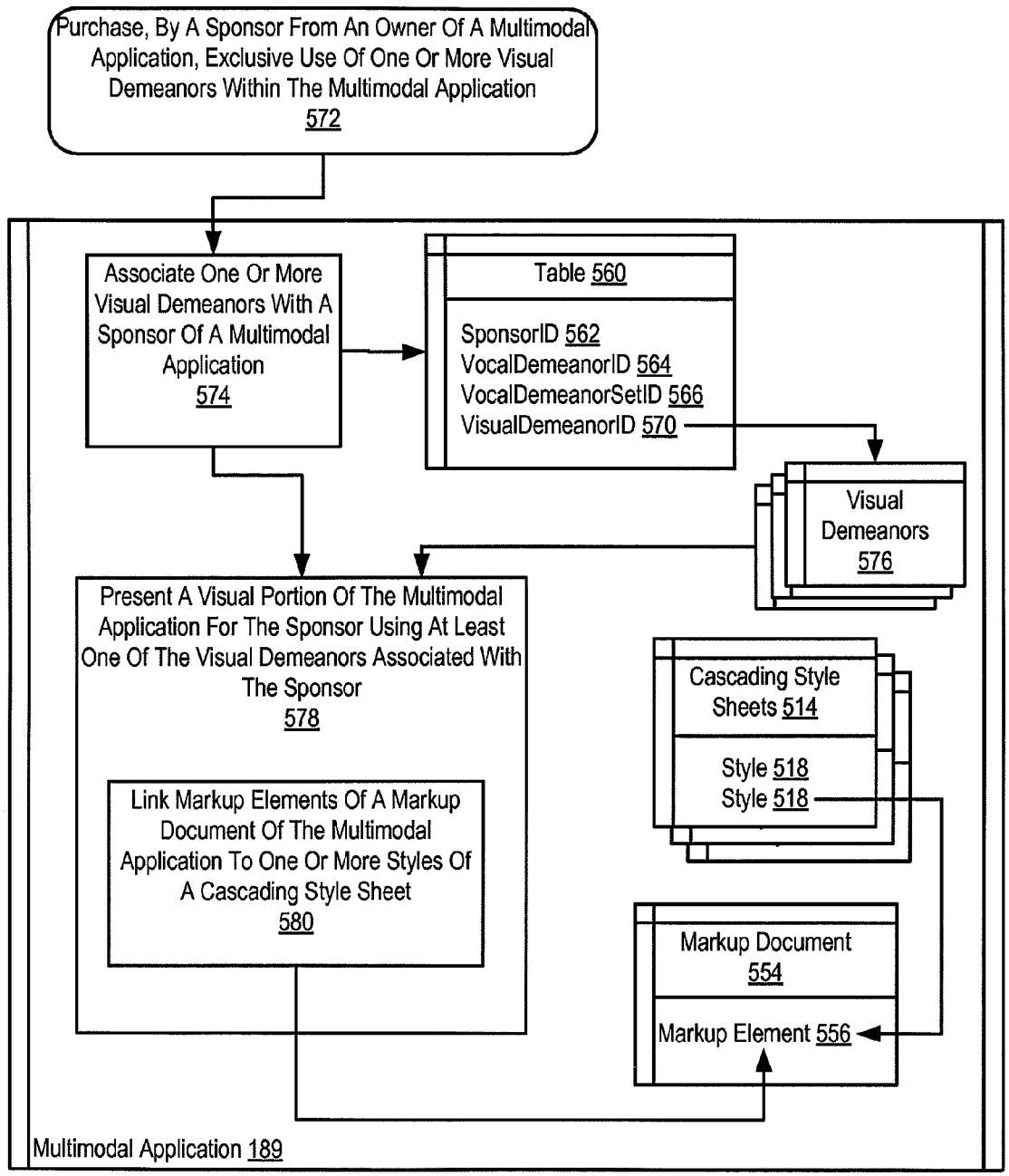
FIG. 8 sets forth a flow chart illustrating a further exemplary method of establishing a multimodal advertising personality for a sponsor of a multimodal application according to embodiments of the present invention.

For further explanation, FIG. 8 sets forth a flow chart illustrating a further exemplary method of establishing a multimodal advertising personality for a sponsor of a multimodal application (189) according to embodiments of the present invention. The method of FIG. 8 includes purchasing (572) by the sponsor from an owner of the multimodal application exclusive use of one or more visual demeanors within the multimodal application. As mentioned above, visual demeanor is the overall visual appearance of a multimodal application, background colors, text colors, text fonts, selection and placement of graphic elements, and so on. Visual demeanor may be characterized by attributes such as age (vibrant colors for young users, quieter colors for mature users), gender (sans serif fonts for women, serifs for men), location (Eiffel Tower background for Parisians, the Alamo for Texans), time (bright color palettes in the morning, quieter palettes in the evening), application domain (more text for legal subjects, more graphics for architectural subjects), and so on as will occur to those of skill in the art.

The method of FIG. 8 also includes associating (574) one or more visual demeanors (576) with the sponsor of a multimodal application. Associating (574) visual demeanors (576) with sponsors is carried out in this example by use of table (560), each record of which represents an association of a sponsor with a visual demeanor. Each record of table (560) includes a sponsorID field (562) for storing an identification code for a sponsor, and each record of the table includes a VisualDemeanorID field (570) for storing an identification code for a visual demeanor. Multiple records in the table may associate more than one visual demeanor with a sponsor.

The method of FIG. 8 also includes presenting (578) a visual portion of the multimodal application for the sponsor using at least one of the visual demeanors (576) associated with the sponsor. Presenting (578) a visual portion of the multimodal application for the sponsor using at least one of the visual demeanors (576) associated with the sponsor in this example includes linking (580) one or more markup elements (556) of a markup document (554) of the multimodal application (189) to one or more styles (518) of a Cascading Style Sheet ('CSS') (514). The multimodal application can link (512) one or more markup elements (556) of a markup document (554) of the multimodal application (189) to one or more styles (518) of a CSS (514) as shown in the following excerpt from the example X+V page set forth above:

```
<link rel="stylesheet" type="text/css"
    href="http://www.ibm.com/style/demeanor.jsp" />
```

The <h2> heading element:

```
<h2 id="p1" class="server">Would you like coffee, tea, milk, or nothing?</h2>
``` is controlled by a class attribute, class="server," that identifies the style to be returned from the reference to the external CSS, "demeanor.jsp." The value of the style returned may be, for example:

```
h2.server {voice-family: female
        color: red
        background: yellow
        font-weight: bold
}
h3 {voice-family: male
        color: black
        background: white
        font-weight: normal
}
``` signifying that <h2> headings that reference class="server" have visual demeanor set to the color red for text display, background color yellow, and bold font. <h3> headings all have their visual demeanor set to black text, white background, and normal font.

Figure 9:
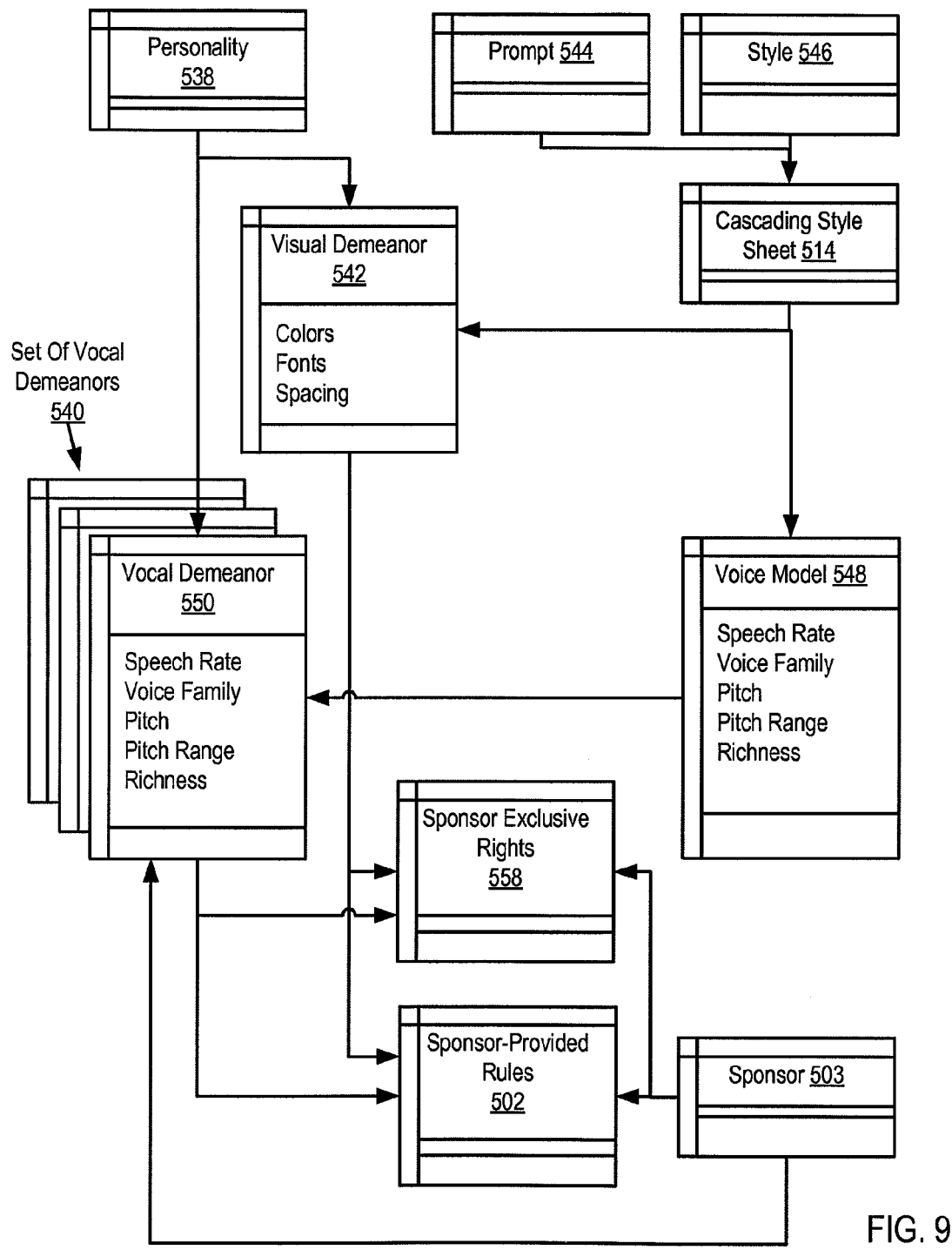
FIG. 9 sets forth an exemplary Unified Modeling Language ('UML') model of vocal demeanor according to embodiments of the present invention.

For further explanation, FIG. 9 sets forth an exemplary Unified Modeling Language ('UML') model of vocal demeanor according to embodiments of the present invention. The UML model of FIG. 9 illustrates relationships among system components that associate vocal demeanors (550) with a sponsor (503) of a multimodal application and present a speech portion of the multimodal application for the sponsor using at least one of the vocal demeanors associated with the sponsor. The model of FIG. 9 uses Cascading Style Sheet (514) used to control the vocal demeanor (542) and visual demeanor (550) for a specific prompt (544) in operation of a user interface of a multimodal application. Styles or 'CSS rules' (546) of a CSS (514) affect a voice model (548) to effect a vocal demeanor (550). In effect, then, particularly from the point of view of a user, a vocal demeanor for a prompt (544) appears aurally as the sound of a voice model at it is affected by selection of styles (546) of a Cascading Style Sheet (514). As shown in the UML, a style (546), in an object oriented sense, can be instantiated from many style classes—so that the results returned for a demeanor can contain more than one prompt class. Similarly, a returned CSS can be an instance instantiated from any one of hundreds or thousands of CSS classes.

The UML model of FIG. 9 includes structure representing sponsors' exclusive rights (558) to use of a vocal demeanor or visual demeanor within the multimodal application. As noted above, in establishing a multimodal advertising personality for a sponsor of a multimodal application according to embodiments of the present application, sponsors may acquire from an owner of the multimodal application exclusive use of a vocal demeanor (550) or exclusive use of a set (540) of vocal demeanors within the multimodal application, including a right to exclude from use within a portion of the multimodal application all vocal demeanors not in the set of vocal demeanors. The UML model of FIG. 9 also includes structure representing sponsor-provided rules (502) for selecting, by the multimodal application among a set (540) of vocal demeanors in which a sponsor (503) has acquired exclusive rights (558), a vocal demeanor for presentation of a speech portion of the multimodal application for the sponsor.

Exemplary embodiments of the present invention are described largely in the context of a fully functional computer system for establishing a multimodal advertising personality for a sponsor of a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone data communications networks for voice communications and digital data communications data communications networks such as, for example, Ethernets™ and data communications networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. A method of operating a multimodal application, the method comprising:

selecting, using a processor, a demeanor for presentation of content of a content provider via the multimodal application, wherein selecting the demeanor comprises considering, by the processor, at least one characteristic of a user of the multimodal application to whom the content is to be provided, the user differing from the content provider, wherein the at least one characteristic of the user comprises whether the user is a repeat user of the multimodal application; and presenting the content to the user using the demeanor;

wherein selecting the demeanor comprises selecting a visual demeanor and/or selecting a vocal demeanor;

wherein selecting the visual demeanor comprises selecting from the group consisting of background colors, text colors, text fonts, and selection and placement of graphic elements; and wherein selecting the vocal demeanor comprises selecting from the group consisting of speech rate, voice family, pitch, pith range, stress and richness.

2. The method of claim 1, wherein the at least one characteristic of the user comprises gender.

3. The method of claim 1, wherein the at least one characteristic of the user comprises location of the user.

4. The method of claim 1, wherein selecting the demeanor comprises selecting the vocal demeanor.

5. The method of claim 1, wherein selecting the demeanor comprises selecting the visual demeanor.

6. The method of claim 1, further comprising directly determining the user characteristic.

7. A system, comprising:
a processor; and
a computer recordable medium operatively coupled to the processor, the computer recordable medium storing computer program instructions which, when executed by the processor, cause the processor to perform a method comprising:
selecting, using a processor, a demeanor for presentation of content of a content provider via the multimodal application, wherein selecting the demeanor comprises considering, by the processor, at least one characteristic of a user of the multimodal application to whom the content is to be provided, the user differing from the content provider, wherein the at least one characteristic of the user comprises whether the user is a repeat user of the multimodal application; and
presenting the content to the user using the demeanor;
wherein selecting the demeanor comprises selecting a visual demeanor and/or selecting a vocal demeanor;
wherein selecting the visual demeanor comprises selecting from the group consisting of background colors, text colors, text fonts, and selection and placement of graphic elements; and
wherein selecting the vocal demeanor comprises selecting from the group consisting of speech rate, voice family, pitch, pith range, stress and richness.

8. The system of claim 7, wherein the at least one characteristic of the user comprises gender.

9. The system of claim 7, wherein the at least one characteristic of the user comprises location of the user.

10. The system of claim 7, wherein selecting the demeanor comprises selecting the vocal demeanor.

11. The system of claim 7, wherein selecting the demeanor comprises selecting the visual demeanor.

12. The system of claim 7, wherein the method further comprises directly determining the user characteristic.

13. A non-transitory computer recordable medium comprising computer program instructions which, when executed, cause performance of a method comprising:
selecting, using a processor, a demeanor for presentation of content of a content provider via the multimodal application, wherein selecting the demeanor comprises considering, by the processor, at least one characteristic of a user of the multimodal application to whom the content is to be provided, the user differing from the content provide, wherein the at least one characteristic of the user comprises whether the user is a repeat user of the multimodal application; and
presenting the content to the user using the demeanor;
wherein selecting the demeanor comprises selecting a visual demeanor and/or selecting a vocal demeanor;
wherein selecting the visual demeanor comprises selecting from the group consisting of background colors, text colors, text fonts, and selection and placement of graphic elements; and
wherein selecting the vocal demeanor comprises selecting from the group consisting of speech rate, voice family, pitch, pith range, stress and richness.

14. The non-transitory computer recordable medium of claim 13, wherein the at least one characteristic of the user comprises gender.

15. The non-transitory computer recordable medium of claim 13, wherein the at least one characteristic of the user comprises location of the user.

16. The non-transitory computer recordable medium of claim 13, wherein selecting the demeanor comprises selecting the vocal demeanor.

17. The non-transitory computer recordable medium of claim 13, wherein selecting the demeanor comprises selecting the visual demeanor.

* * * * *

UNITED STATES PATENT AND TRADEMARK OFFICE
CERTIFICATE OF CORRECTION

| | |
|---|---|
| PATENT NO. | : 8,498,873 B2 |
| APPLICATION NO. | : 13/535588 |
| DATED | : July 30, 2013 |
| INVENTOR(S) | : Charles W. Cross and Hilary A. Pike |

It is certified that error appears in the above-identified patent and that said Letters Patent is hereby corrected as shown below:

In the Claims:

Column 25, line 7, "pith" should be --pitch--.
Column 25, line 43, "pith" should be --pitch--.
Column 26, line 30, "pith" should be --pitch--.

Signed and Sealed this
Seventh Day of October, 2014

Michelle K. Lee
*Deputy Director of the United States Patent and Trademark Office*